Figure 1:
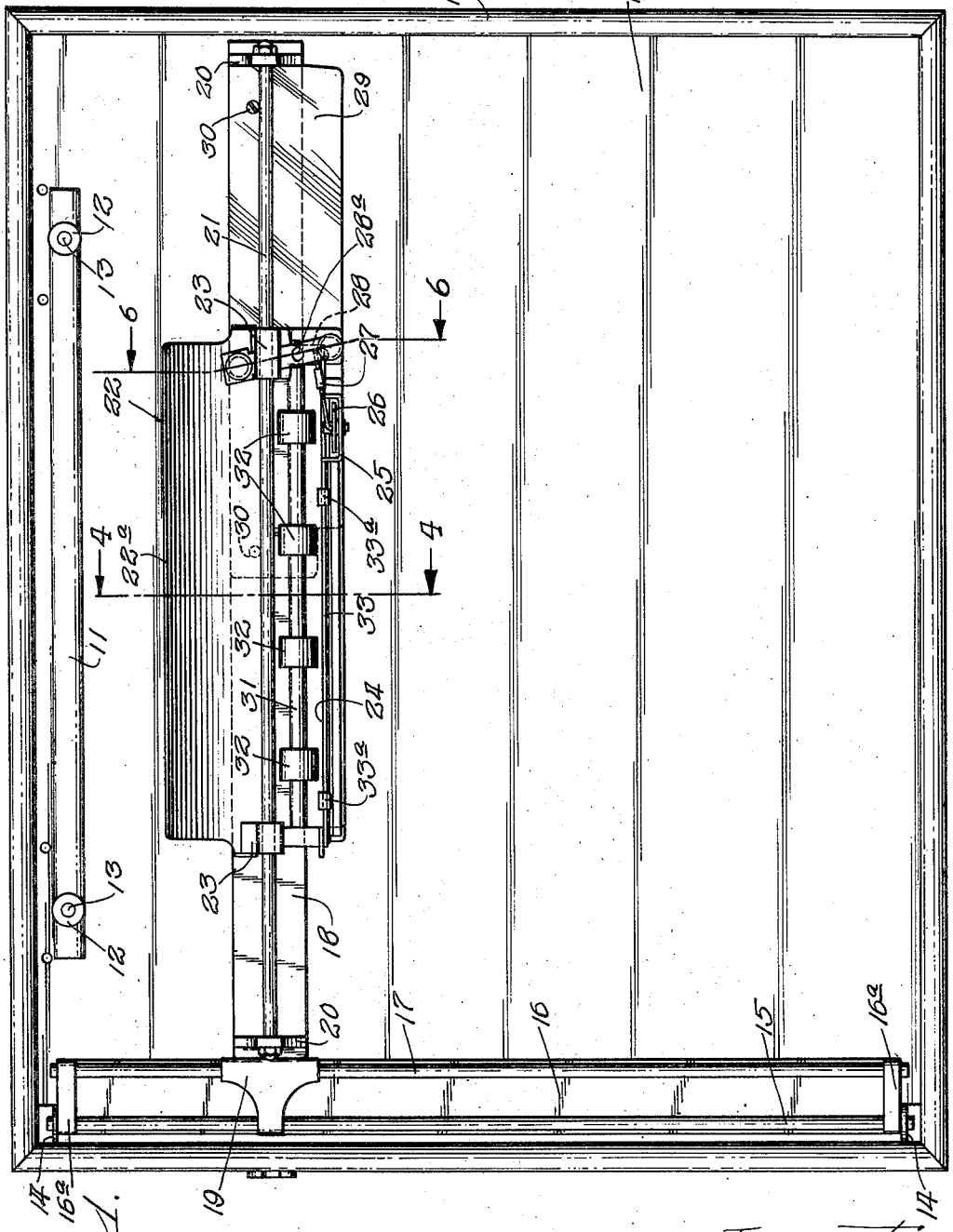

Sept. 26, 1950 J. B. ADAMS 2,523,803
BOOKKEEPING DEVICE
Filed May 6, 1947 3 Sheets-Sheet 1

Inventor:
John B. Adams,
By Chritton, Schroeder, Merriam & Hofgren,
Attys.

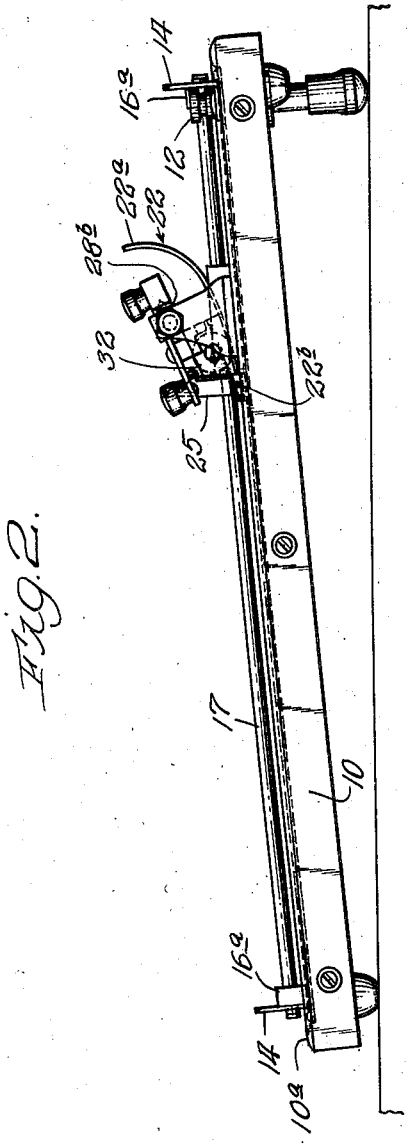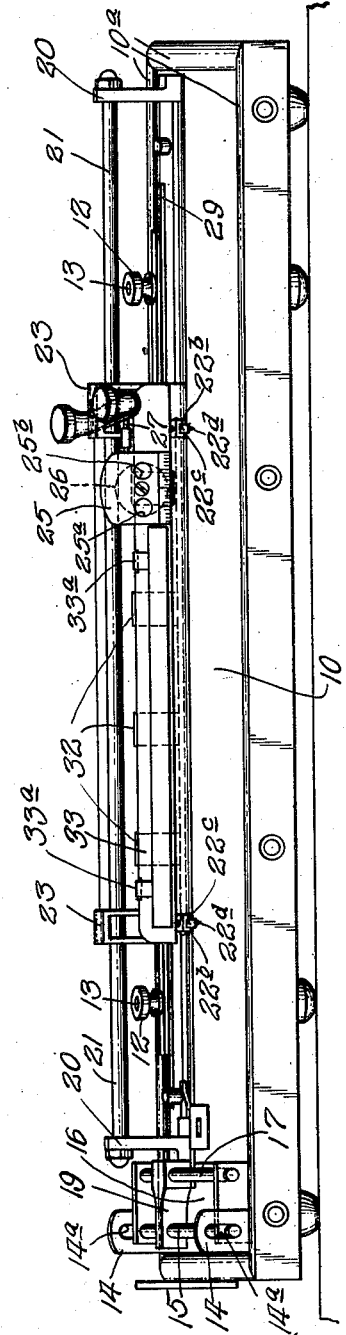

Sept. 26, 1950  J. B. ADAMS  2,523,803
BOOKKEEPING DEVICE
Filed May 6, 1947  3 Sheets-Sheet 3
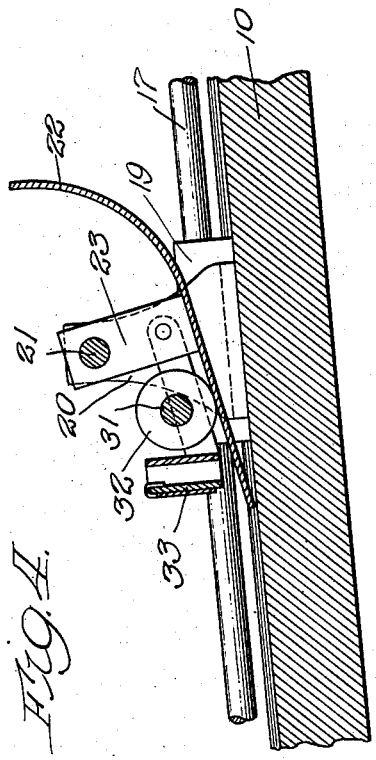
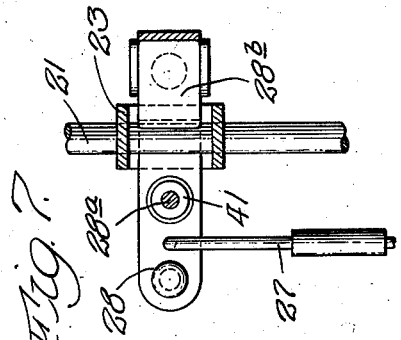
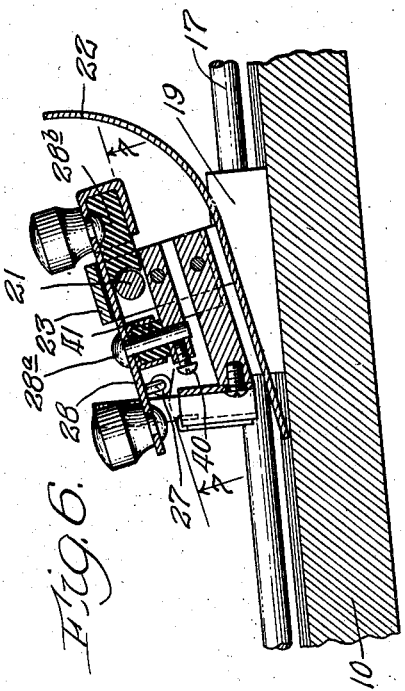
Inventor:
John B. Adams,
By Clinton Schroeder,
Merriam & Myers, Attys.

Patented Sept. 26, 1950

2,523,803

UNITED STATES PATENT OFFICE 2,523,803

BOOKKEEPING DEVICE

John B. Adams, Chicago, Ill.

Application May 6, 1947, Serial No. 746,353

5 Claims. (Cl. 282—29)

This invention relates to a bookkeeping device.

The bookkeeping device which is the subject of this invention enables the bookkeeper to follow a system in which the original entries taken from invoices and the like are posted directly to ledger accounts and to an assembly sheet in one operation. The device enables the bookkeeper to record these entries faster, easier, and with less chance of error. In using the device, ordinary methods of bookkeeping are followed. Greater efficiency is attained and bookkeeping costs are reduced in that the slow process of first recording to a journal and then posting to an appropriate ledger account is eliminated.

The new bookkeeping device broadly comprises a base plate, means at one edge of the plate for retaining corresponding edges of a plurality of superposed sheets of bookkeeping paper, such as journal paper, a guide member at another edge of the plate, a bar slidably mounted on the guide member and extending across the plate, means for maintaining the bar at a substantially constant angle with respect to the guide member, and a holding member for a second sheet of bookkeeping paper such as a ledger sheet slidably mounted on the bar and having a straight edge adjacent the plate adapted to be aligned with a line on the sheet of bookkeeping paper that is attached to the plate.

With this construction, several different journal sheets may be attached to the base plate at the same time and items entered either on the first sheet or any subsequent sheet by turning the top sheets back. The bar which carries the holding member may be rotated out of the way so that the sheets on the plate may be turned back out of the way.

In using the device, the column headings are preferably placed on the bottom of the journal sheet or the like that is attached to the base plate. The titles of the various accounts are entered on the left side of the ledger sheet. It is just as easy, however, if desired, to enter these account titles on the right side of the sheet. As the ledger sheets are ordinarily much narrower than the journal sheets, the holding member for the ledger sheet is also narrower and can be moved back and forth along the bar in order to align the ledger sheet with the proper column and title on the journal sheet.

In operating the device, a ledger sheet is placed in proper position in the holding member so that the desired line on the ledger sheet is placed over the journal sheet. The bar is then moved to the proper position so that the line on the ledger sheet overlies the desired line on the journal sheet. The holding member is then moved until the location of the entry on the ledger sheet is aligned with the proper column. A piece of carbon paper or other transfer means is placed under the ledger sheet and entries are made on the ledger sheet and on the proper column and proper line of the journal sheet in one operation. These entries are made from the original sales slip, check, invoices, or the like. Thus, posting to the journal and the ledger is accomplished in one operation. It can readily be determined that an entry has been posted on the journal sheet as it will be in carbon. In order to prevent smudging of the journal sheet from the carbon on the carbon paper, it is preferred that the carbon paper be held in a holder that leaves only a narrow width of carbon paper exposed with this width being equivalent to the width of a line on the ledger sheet and journal sheet.

In one method of bookkeeping by using the device of this invention, the journal columns are reduced to seven double columns. These may be entitled cash, accounts payable, purchases, accounts receivable, sales, expenses, and general ledger. The totals in each column are transferred from one sheet to the next sheet so that a trial balance may be made up at any time. By using this device, it has been found that cash audits, annual reports, financial statements, social security records, federal sales tax returns, and the like may be made with greater ease and less expense. The assembly or journal sheet that is used is identical to the journal forms used in all double-entry bookkeeping systems with the exception that the titles of the columns are preferably located at the bottom instead of the top. In using the device, items are recorded on the ledger account and the journal sheet in a single entry by means of the carbon paper instead of from a journal to a ledger account.

The old methods of bookkeeping require a new start each month in which double entries are written on a journal sheet to various classified columns extending over two or more pages. At the end of a certain designated time, the columns are added and if the totals of the debits and credits are in balance, the totals are forwarded to the respective series of pages. At the end of each month, the column totals are posted to various ledger accounts. This method of recording first to a journal and then posting to a ledger involves many factors which often result in error regardless of the ability of the bookkeeper. The moment the first entry is made to an accounts payable or receivable, the ledgers are not in balance. The monthly control totals of various journal columns, covering more than one sheet, cannot be posted to a ledger until the closing of a month's transactions. It is only possible to determine that the ledger are in balance at that time. Under the described method, by using the present device, original entries are posted directly to individual ledger accounts and automatically recorded on an assembly or journal chart in one operation.

In using the bookkeeping device for keeping a payroll account, an assembly sheet containing the payroll information is positioned on the base plate. This assembly sheet contains the names of the employees and time records for each day of the month, the gross amount earned, the various deductions, the net wage, and any other necessary information. It is preferred that in this instance the names of the employees be listed on the right side of the assembly sheet. The various information that must be written on the check stub is then arranged to the left of the name column. The holding member is then locked in place over that portion of the sheet which contains the listed information that must go on the check or check stub. The holding member is aligned with a particular name. A voucher check or a cash payment slip is placed under the holding member and a piece of carbon paper is placed thereunder. The employee's history earning record is then placed over the voucher check with a piece of carbon paper under it. The items are then entered simultaneously on the payroll register or journal that is attached to the base plate, the payroll voucher check, and the employee's earning record. The amounts are obtained from the individual checks that are typed from payroll statements compiled by the timekeeping department. With this arrangement, three identical recordings are made in one writing operation. In order to aid in getting the individual entries in their proper places, a name plate containing the arrangement that is listed on the payroll journal may be attached to the holding member. This prevents making an entry on a wrong place. Thus, all payroll records are completely up-to-date as soon as entries have been recorded on the payroll register.

The bookkeeping device will be described as related to the embodiment shown in the accompanying drawings. Of the drawings:

Fig. 1 is a plan view of the bookkeeping device which is the subject of this invention and showing the device arranged for making payroll entries; Fig. 2 is a side elevation of the new bookkeeping device; and Fig. 3 is a front elevation thereof; Fig. 4 is a section taken substantially along line 4—4 of Fig. 1; Fig. 5 is a front elevation of an indicia strip; Fig. 6 is a section taken substantially along line 6—6 of Fig. 1; and Fig. 7 is a section taken substantially along line 7—7 of Fig. 6.

The bookkeeping device shown in the accompanying drawings comprises a base plate 10 of rectangular shape and bounded by metal edges 10a, a metal strip 11 at the top of the plate held in place by two spaced nuts 12 engaging bolts 13, and a pair of end brackets 14 located at the left edge of the plate 10 with each bracket being adjacent a corner of the plate and having an upstanding slot 14a therein. There is provided a plate 16 located between the brackets 14 and carrying parallel rods 15 and 17. These rods are held in upstanding end portions 16a on the plate 16 and the rod 15 extends beyond the portions 16a and is held in the slots 14a. A bar 18 is slidably mounted on the rods 15 and 17 and extends across the base plate 10. The mounting for the bar 18 comprises a portion 19 in the form of a block slidably mounted on the rods 15 and 17 and being of approximately triangular shape with the base of the triangle embracing the rod 17. This triangular structure serves to maintain the bar 18 at 90° to the rods 15 and 17 at all times.

Mounted on the bar 18 are two raised end brackets 20. Extending between these end brackets there is located a rod 21 arranged substantially parallel to the bar 18. Slidably and rotatably mounted on the rod 21 is a holding member 22 of considerably less width than the length of the rod 21. This holding member 22 has a bottom portion 22a of scooped shape with the rear edge of the scoop extending approximately vertical and the front edge of the scoop being adjacent the base plate 10. The bottom portion 22a is mounted on the rod 21 by means of end brackets 23. Across the front of the holding member 22 there is located a flat strip 24 of metal or the like with this strip being spaced above the scoop portion 22a. The front side edges of the scoop are arranged as inverted U's 22b and are provided with blocks of rubber 22c whose bottom faces are adapted to contact a sheet of paper arranged on the base plate 10. These blocks of rubber aid in properly locating the holding member 22. Extending from the bottom surfaces of the blocks are small pins 22d which also assist in this locating.

Mounted on the strip 24 is housing 25 with this housing being located at the front of the strip. Within the housing there is located a rotatably mounted disk 26 that is visible through two holes 25a and 25b in the front surface of the housing. The disk 26 is attached by means of an arm 27 to a lever 28 rotatably mounted about a fulcrum 28a at the front of the right-hand end bracket 23. The arm 27 is so attached to the disk 26 and the lever 28 that when the lever is turned about its fulcrum the disk 26 is also turned. The disk is provided with a black portion so that when the lever 28 is turned in one direction this black portion will be visible through one of the holes 25a or 25b. Another portion of the disk is colored red so that when the lever is turned in an opposite direction this portion will be visible in the other hole. The red is used when making credit entries while the black is used when making debit entries. This serves as a constant reminder to the bookkeeper as to the type of entries he is making.

The lever 28 also serves to lock the holding member 22 on the rod 21. In order to accomplish this, the rear end of the lever is provided with a block of rubber 28b which bears against the rod 21 when the lever 28 is turned. The disk 26, while not absolutely essential to the operation of the device, is preferred as it serves as a constant reminder to the bookkeeper as to the type of entries he is making. This disk may be turned in any manner desired although it is shown as turned by operating the lever 28. The lever 28 may be operatively attached to the disk 26 by any means desired. In the embodiment shown, it is attached by the arm 27.

The construction and operation of the lever lock is illustrated in Figs. 6 and 7. The lever 28 is mounted for rotation about the fulcrum pin 28a. This fulcrum pin 28a extends through the lever 28 and has its lower end held in a portion of an end bracket 23. This particular end bracket is the one shown on the right-hand side of the holding member 22 in Fig. 1. As shown here, this end bracket is wider than the other end bracket.

The lower end of the fulcrum pin 28a is held against rotation by means of a set screw 40. The lever 28 is loosely mounted on the fulcrum pin 28a so as to be rotatable therearound. The portion of the pin between the lever 28 and the mounting for the set screw 40 is provided with a block 41 of rubber or the like. This rubber block is used to provide pressure on the lever 28 and thus causes it to resist rotation. In adjusting the pressure on the lever the set screw 40 may be loosened and the fulcrum pin 28a either pressed down further or permitted to raise up to apply or release compression on the rubber block 41. The compressive forces within the block 41 causes frictional pressure to be applied to the lever 28.

As is shown in Fig. 6, the rubber may be brought to bear against the rod 21 by merely turning the lever 28. Pressure applied to the lever 28 by the rubber block 41 holds the lever in its adjusted position. The pressure of the rubber 28b maintains the holding member 22 in position on the rod 21.

The bookkeeping device as shown in the drawings is arranged for making payroll records. This is accomplished by having a sheet 29 of transparent material, such as a plastic, attached to the right-hand side of the bar 18. The sheet is transparent so that the employees' names which are preferably listed on the right-hand side of a sheet positioned in the bookkeeping device may be read through the sheet. In daily ordinary bookkeeping, this sheet of transparent material will be removed so that the holding member 22 may be freely moved along the rod 21. The sheet of transparent material may be held in place by any means desired. As shown, it is held by small screws 30.

Extending lengthwise of the holding member 22 and directly behind the flat strip 24, there is located a rotatably mounted rod 31 having spaced rubber rollers 32 thereon. These rollers bear against the scoop-shaped portion 22a and serve to hold a ledger sheet in the holding member. The ledger sheet may be easily inserted either from the front or the rear of the holding member and will be positivly held in place.

In order to aid in making payroll entries in the proper columns, there is provided an indicia strip 33 which is removably mounted on the flat strip 24 as by spring clamps 33a. This indicia strip has marked thereon the columns corresponding to the columns used in keeping payroll records. Each indicia on the strip will be located above the corresponding column on a record sheet held in the holding member and will thus prevent entering amounts to improper columns.

The base plate 10 can accommodate a large number of superposed journal sheets. These will be arranged in the form of a pad. The slots 14a in the brackets 14 permit the device to accommodate itself to a large number of these sheets. When it is desired to make an entry on a journal sheet under the first sheet the bar 18 may be rotated in a plane at right angles to the base plate 10 and the top journal sheets turned back. The bar may then be turned back to the place on top of the desired sheet.

In some bookkeeping systems items are posted on several sheets of paper at once by arranging carbon paper between them and writing on the top sheet. The posting on every sheet except the top one is therefore "blind," and is likely to cause errors if one or more sheets are out of line. By using the apparatus of this invention such blind posting is avoided as the operator is aware at all times of the sheets and the lines thereon to which he is posting.

Having described my invention it is my intention that the invention be not limited by any of the details of description unless otherwise specified but rather be construed broadly within its spirit and scope as set out in the accompanying claims.

I claim:

1. A bookkeeping device comprising a base plate, means at the top edge of said plate for retaining corresponding edges of a plurality of superposed sheets of bookkeeping paper, a narrow guide member at a side edge of said plate, a narrow bar slidably mounted on said guide member extending across said plate, relatively narrow means engaging said guide member for maintaining said bar at a substantially constant angle with respect to said guide member, a scoop-shaped holding member for another sheet of bookkeeping paper slidably mounted on said bar with the rear edge of said scoop being above said plate and the front edge of the scoop being straight and adjacent said plate, said front edge being adapted to be aligned with a line on said first sheet of bookkeeping paper, means for holding said other sheet of bookkeeping paper with a line thereon substantially aligned with and disposed over a line on said first sheet comprising spaced substantially freely rotatable rollers pressing the other sheet against the scoop-shaped holding member and side guides on the holding member to prevent substantially lateral displacement of the other sheet, and means for locking said holding member in any desired position on said bar.

2. A bookkeeping device comprising a base plate, means at the top edge of said plate for retaining corresponding edges of a plurality of superposed sheets of bookkeeping paper, a narrow guide member at a side edge of said plate, a narrow bar slidably mounted on said guide member extending across said plate, relatively narrow means engaging said guide member for maintaining said bar at a substantially constant angle with respect to said guide member, a rod mounted on said bar and spaced thereabove, a scoop-shaped holding member for another sheet of bookkeeping paper slidably mounted on said rod with the rear edge of said scoop being above said plate and the front edge of the scoop being straight and adjacent said plate, said front edge being adapted to be aligned with a line on said first sheet of bookkeeping paper, means for holding said other sheet of bookkeeping paper with a line thereon substantially aligned with and disposed over a line on said first sheet comprising substantially freely rotatable spaced rollers pressing the other sheet against the scoop-shaped holding member and side guides on the holding member to prevent substantially lateral displacement of the other sheet, and means for locking said holding member in any desired position on said bar.

3. The device of claim 2 wherein said locking means comprises a lever rotatably mounted on said holding member adjacent the rod upon which said member is mounted and extending there-across, and at least one block of rubber associated with the lever adapted to bear against said rod and lock the holding member on said rod when said lever is turned.

4. A bookkeeping device comprising a base plate, means at the top edge of said plate for retaining corresponding edges of a plurality of superposed sheets of bookkeeping paper, a narrow guide member at a side edge of said plate and extending substantially the full length thereof, a narrow bar slidably mounted on said guide member extending across said plate, relatively narrow means engaging said guide member for maintaining said bar at a substantially constant angle with respect to said guide member, a scoop-shaped holding member for another sheet of bookkeeping paper slidably mounted on said bar with the rear edge of said scoop being above said plate and the front edge of the scoop being straight and adjacent said plate, said front edge being adapted to be aligned with a line on said first sheet of bookkeeping paper, means for holding said other sheet of bookkeeping paper with a line thereon substantially aligned with and disposed over a line on said first sheet comprising substantially freely rotatable spaced rollers pressing the other sheet against the scoop-shaped holding member and side guides on the holding member to prevent substantially lateral displacement of the other sheet, means for locking said holding member in any desired position on said bar, an indicator on said holding member for alignment with a column on said first sheet of bookkeeping paper, and a rotatable member on said holding member for alternately designating debit and credit column entries.

5. A bookkeeping device comprising a base plate, means at the top edge of said plate for retaining corresponding edges of a plurality of superposed sheets of bookkeeping paper, a narrow guide member at a side edge of said plate, a narrow bar slidably mounted on said guide member extending across said plate and having its opposite end free, relatively narrow means engaging said guide member for maintaining said bar at a substantially constant angle with respect to said guide member, a holding member for fixedly securing a second sheet of bookkeeping paper along the entire width thereof and slidably mounted on said bar, said holding member having a straight edge adjacent the plate adapted to be aligned with a line on said first sheet of bookkeeping paper, said holding member having a length less than that of the bar and being of smoothly curved scoop shape with the rear edge of the scoop being at substantially right angles to the plane of said plate and the front edge of the scoop being straight and adjacent said plate, and means for quickly and releasably locking said holding member in any desired position on said bar.

JOHN B. ADAMS.

REFERENCES CITED

The following references are of record in the file of this patent:

UNITED STATES PATENTS

| Number | Name | Date |
|---|---|---|
| 933,910 | Loewenbach | Sept. 14, 1909 |
| 1,319,430 | Spiro | Oct. 21, 1919 |
| 1,736,342 | Giehler | Nov. 19, 1929 |
| 2,311,052 | Hurup | Feb. 16, 1943 |

FOREIGN PATENTS

| Number | Country | Date |
|---|---|---|
| 134,387 | Switzerland | July 31, 1929 |
| 245,838 | Germany | Apr. 19, 1912 |
| 652,913 | Germany | Nov. 11, 1937 |
| 671,905 | Germany | Feb. 16, 1939 |